United States Patent [19]

Kato

[11] Patent Number: 5,052,960
[45] Date of Patent: Oct. 1, 1991

[54] SUCTION DEVICE FOR OUTBOARD MOTOR

[75] Inventor: Naoki Kato, Hamamatsu, Japan

[73] Assignee: Sanshin Kogyo Kabushiki Kaisha, Hamamatsu, Japan

[21] Appl. No.: 470,930

[22] Filed: Jan. 25, 1990

[30] Foreign Application Priority Data

Jan. 26, 1989 [JP] Japan .................................. 1-17237

[51] Int. Cl.⁵ ............................................. B63H 21/26
[52] U.S. Cl. ......................................... 440/77; 440/88
[58] Field of Search ...................... 440/76, 77, 88, 900, 440/89

[56] References Cited

U.S. PATENT DOCUMENTS

| 3,610,198 | 5/1971 | Alexandrowicz | 440/77 |
| 4,379,702 | 4/1983 | Takada et al. | 440/77 |
| 4,403,971 | 9/1983 | Kobayashi et al. | 440/88 |
| 4,522,602 | 6/1985 | Okazaki | 440/77 |
| 4,734,070 | 3/1988 | Mondek | 440/77 |

FOREIGN PATENT DOCUMENTS

| 100093 | 6/1984 | Japan | 440/88 |
| 207294 | 9/1986 | Japan | 440/77 |

Primary Examiner—Sherman Basinger
Assistant Examiner—Thomas J. Brahan
Attorney, Agent, or Firm—Ernest A. Beutler

[57] ABSTRACT

A cowling arrangement for an outboard motor including an improved air induction system including a cavity formed at the rear end of the main cowling portion and having at least three vertically upstanding ducts for delivering air to the interior of the main cowling and the engine for its operation. The ducts are arranged in such a manner as to improve water separation and prevent the ingestion of water into the engine.

13 Claims, 3 Drawing Sheets

SUCTION DEVICE FOR OUTBOARD MOTOR

BACKGROUND OF THE INVENTION

This invention relates to a suction device for an outboard motor and more particularly to an improved induction system for the protective cowling of the power head of an outboard motor.

In connection with outboard motors it is well known that the power head consists not only of an internal combustion engine, but also of a protective cowling assembly which encircles and encloses the engine. It is desirable to provide such a protective cowling both for appearance purposes and also so as to protect components of the engine from the elements and particularly from the water which may splash around from the operation of the associated watercraft. Of course, it is also necessary to provide air inlet openings in the protective cowling so that air can be drawn into the protective cowling for engine operation. Primarily this air is for the induction system of the engine.

Normally it is the practice to provide a cavity in the main housing portion of the protective cowling that is covered by a closure plate but which defines an air inlet opening, which opening normally faces rearward There is then provided a duct in the upper wall of the depressed portion of the main cowling that permits air to flow from this cavity into the interior of the protective cowling for engine operation. The combination of the location of the air inlet opening and the configuration of the duct is chosen so as to try to eliminate the ingestion of water into the interior of the protective cowling while, at the same time, not restricting air flow. The duct must provide sufficient cross sectional area so as to permit adequate air flow. However, as the cross sectional area of the duct is increased, the likelihood of water injection with conventional systems also increases. Furthermore, if the duct is made of a small cross sectional area, then the high flow velocities which result will, in addition to restricting air flow, tend to draw moisture and water into the interior of the protective cowling.

Although the solution to the aforenoted problem may appear to be obvious, this is not actually true. That is, it may be thought that the problem can be solved by employing multiple ducts that extend through the protective cowling for delivering air to the engine. The space requirements of an outboard motor call for the protective cowling to be extremely compact in nature. As a result, the protective cowling frequently has a generally dome like configuration over the fly wheel of the engine and thus does not afford a great deal of area for the provision of additional ducting. Furthermore, because of the spatial requirements, the location of additional ducts gives rise to small inlet openings or restricted flow areas into the duct inlets which can cause high velocity air flow in this area that will draw water into the interior of the protective cowling.

It is, therefore, a principal object of this invention to provide an improved induction system for the protective cowling of an outboard motor.

It is a further object of this invention to provide an induction system and ducting arrangement for the protective cowling of an outboard motor that will insure adequate air flow but which will also insure against the induction of water into the engine area confined by the protective cowling.

It is a further object of this invention to provide an improved arrangement for drawing air through the protective cowling of an outboard motor for engine operation without restricting air flow, inducing high velocity air flows or causing water to enter the engine compartment.

SUMMARY OF THE INVENTION

This invention is adapted to be embodied in a protective cowling for the power head of an outboard motor to protect the internal combustion engine thereof. The protective cowling is comprised of a main cowling portion that encloses the engine and which defines a volume therearound. A cavity is formed in an area of the main cowling portion and air inlet means is formed in the main cowling portion for delivering atmospheric air to the cavity. At least three air delivery ducts communicate the cavity with the volume for delivering atmospheric air to the engine for its operation.

DETAILED DESCRIPTION OF THE PREFERRED EMBODIMENT OF THE INVENTION

Figure 1:
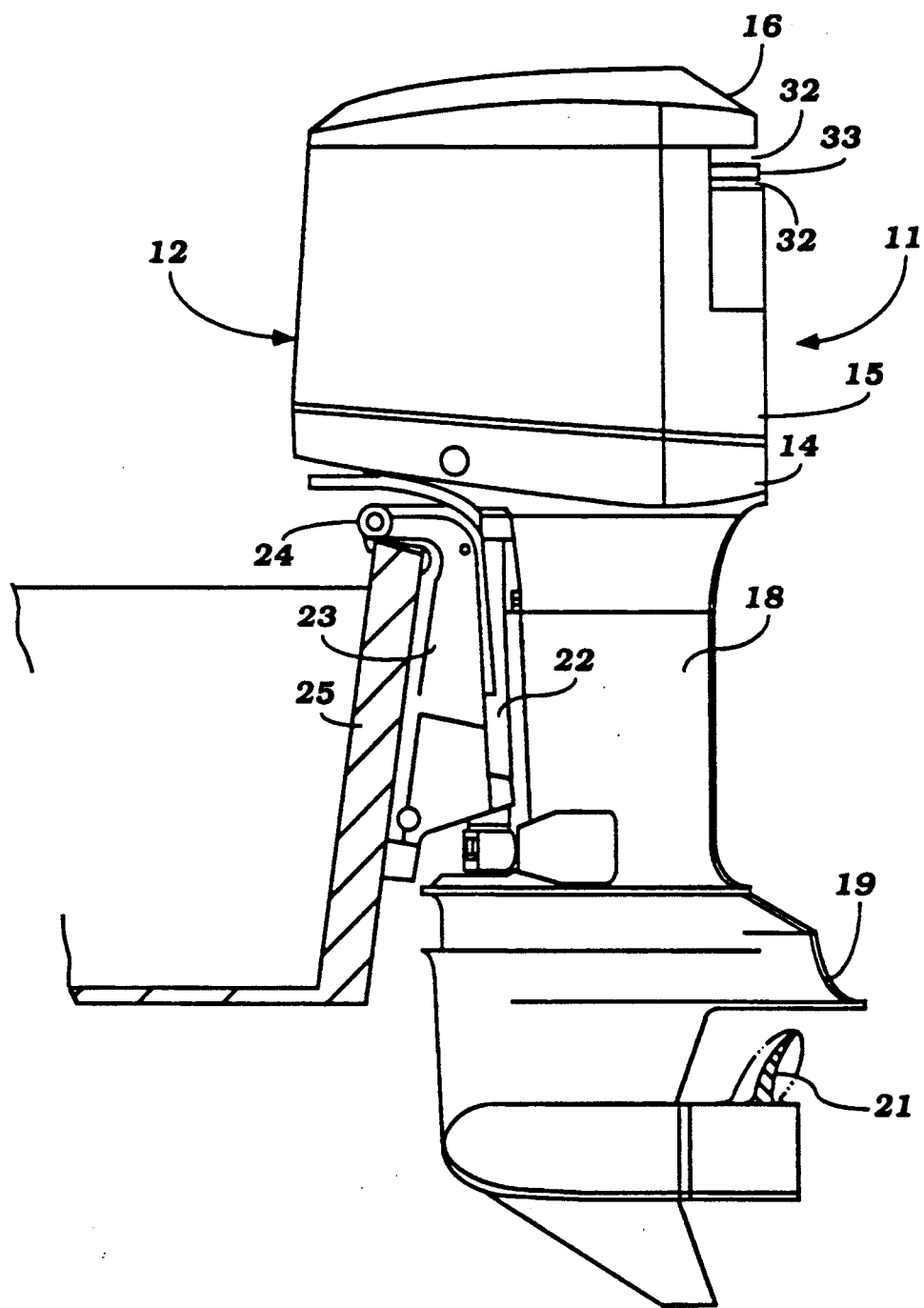
FIG. 1 is a side elevational view of an outboard motor constructed in accordance with an embodiment of the invention.

Referring first to FIG. 1, an outboard motor constructed in accordance with an embodiment of this invention is identified generally by the reference numeral 11. The outboard motor 11 is comprised of a power head, indicated generally by the reference numeral 12 which includes an internal combustion engine, shown in phantom in FIGS. 2 and 3 and identified by the reference numeral 13. The engine 13 is, in the illustrated embodiment, of the V type and specifically a V-6 engine. Although the invention can be utilized in conjunction with other engine formations, it has particular utility with V type engines since such engines are relatively large and present particular spatial problems in connection with an outboard motor.

In addition, the engine 13 is encircled within a protective cowling which is comprised of a lower or tray portion 14, a main cowling portion 15 and a cover plate 16. These components will be described in more detail later.

The engine 13 is, as is typical with outboard motor practice, supported so that its output shaft rotates about a vertically extending axis. A flywheel magneto assembly 17 is affixed to the upper end of the engine output shaft for generating electrical power for the ignition system and other components. This flywheel magneto assembly 17 is covered by means of a cover plate (not shown).

The output shaft of the engine 13 drives a drive shaft (not shown) that is journaled within a drive shaft housing 18 which depends from the power head 12. This drive shaft then drives a forward, neutral, reverse transmission (not shown) contained within a lower unit 19 for driving a propeller 21 in selected forward and reverse directions.

A steering shaft (not shown) is affixed to the drive shaft housing 18 in a known manner and journals the outboard motor 11 for steering movement about a generally vertically extending axis within a swivel bracket 22. The swivel bracket 22 is, in turn, connected to a clamping bracket 23 for pivotal movement about a horizontally extending tilt and trim axis by a pivot pin 24. The clamping bracket 23 carries means for affixing the outboard motor 11 to a transom 25 of a watercraft. The construction of the outboard motor as thus far described may be considered to be conventional. For that reason, further details of its construction are not believed to be necessary to understand the construction and operation of the invention.

Figure 3:
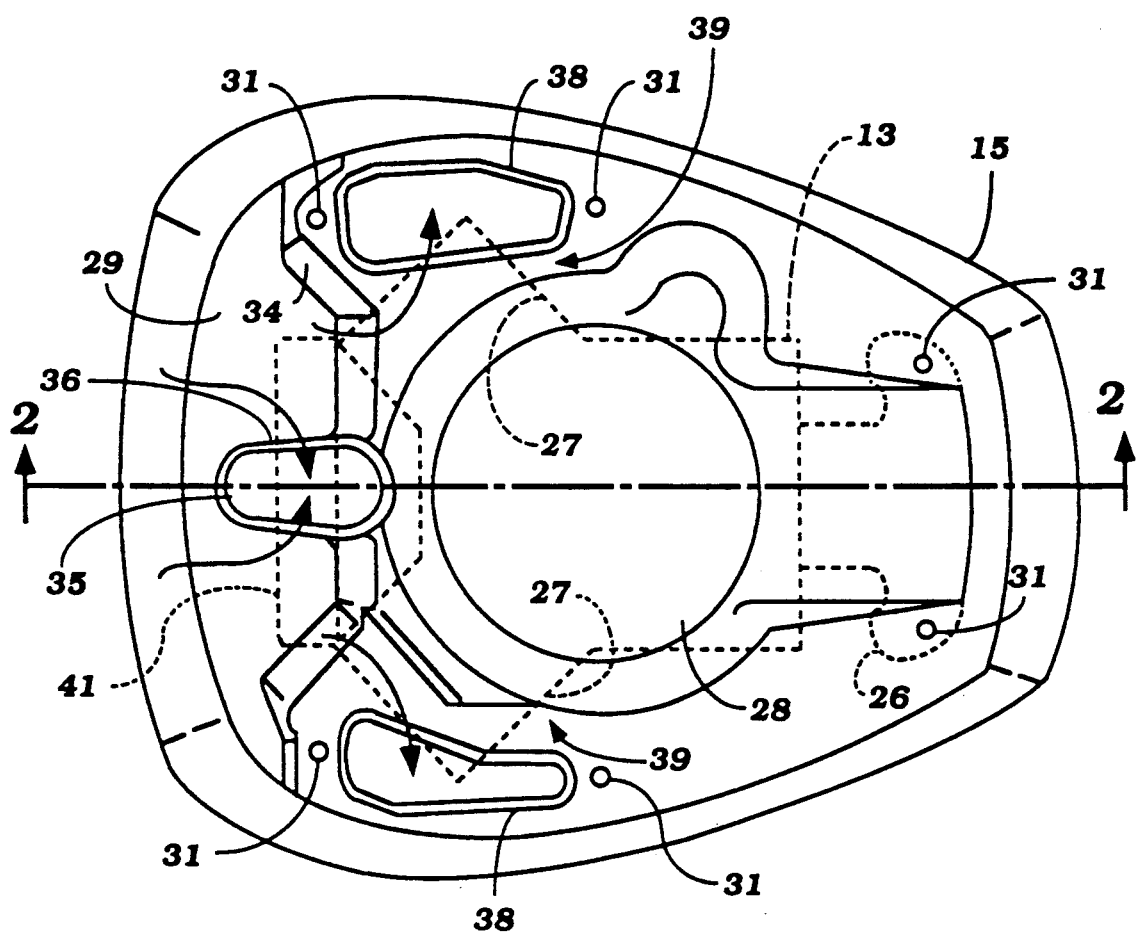
FIG. 3 is a top plan view of the protective cowling with the cover plate therefor removed.
Figure 4:
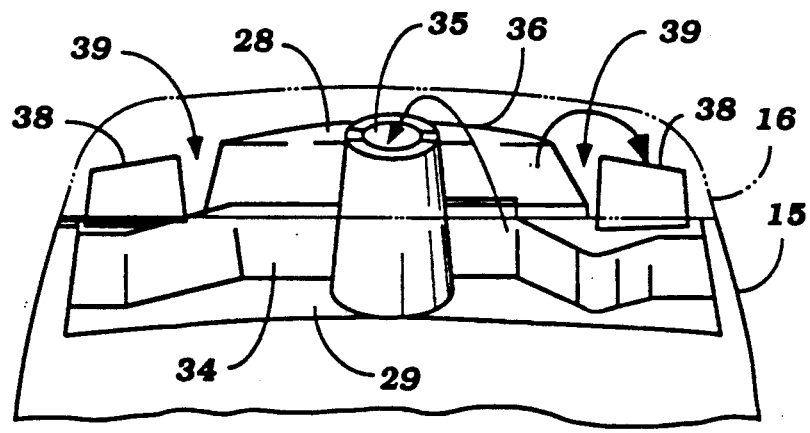
FIG. 4 is a rear elevational view of the protective cowling with the cover removed and showing the air flow therethrough.

As may be best seen in FIG. 3, the engine 13, which, as has been noted, is of the V type, is positioned so that its induction system 26 is at the forward portion of the protective cowling and supplies a fuel/air charge in a known manner to a crankcase. The engine 13 is of the two cycle crankcase compression type, as is typical with outboard motor practice. It is to be understood, however, that the invention can be utilized in conjunction with other types of engines. The engine further includes a pair of angularly disposed rearwardly diverging cylinder banks 27 in which the cylinder bores are formed and which are closed by cylinder heads. Since the construction of the engine per se forms no part of the invention, it is believed unnecessary to describe it further. However, the orientation of the engine 13 within the protective cowling is important. For that reason the engine has been depicted in broken lines in certain of the figures.

It should be noted that the main cowling member 15 is provided with a raised dome portion 28 that extends over the flywheel magneto 17. The cowling portion 15 then tapers downwardly and to the sides. At the rear portion thereof, there is provided a cavity that is defined by a generally low, flat surface 29 of the main cowling member 15 which flat surface 29 extends forwardly from the rear end of the main cowling member 15. This area is enclosed by the cover member 16 which is held to the main cowling portion 15 by means of fasteners which extend through openings 31 formed in the upper surface of the main cowling member 15. The cover 16 defines a rearwardly facing air inlet opening 32 which extends across the width of the rear portion of the outboard motor and which is divided into upper and lower portions by a transversely extending baffle plate 33. The baffle plate 33 insures that large objects cannot enter into the cavity defined between the flattened portion 29 and the cover 16 but does not significantly restrict the air flow.

There is provided an upstanding wall 34 which has a generally W shape as may be best seen in FIG. 3 which wall 34 extends to a point slightly higher than the height of the opening 32 for a reason to be described. Centrally of this wall 38 there is provided a first inlet duct 35 which has a generally oval configuration that is defined by an upstanding wall 36. The upper ends of the wall 36 are relieved, as at 37 to reduce the flow restriction and to permit air easily to be drawn into the volume surrounding the internal combustion engine 13 through this duct.

There are provided a further pair of ducts 38 which are disposed and extend upwardly from a further upper wall of the main cowling member 15 which extends partially over the cylinder banks at the outer periphery of the sides of the main cowling member 15. These ducts 38 have their inlet openings disposed above the inlet opening 32. Air can easily flow to them through recesses or relief passages 39 formed in the main cowling member 15.

It should be readily apparent that air drawn into the air inlet opening 32 will impinge upon the wall 34 and be redirected upwardly through the reliefs 39 before it can flow to the ducts 38. As a result, any water which may be drawn into the cavity thus far described will be separated by the circuitous path and the impingement on the wall 34. This wall 34 also redirects the air upwardly to the duct opening 35 and provides a further water separating purpose for this duct.

It should be noted that the spark control box 41 for the engine 13 may be conveniently positioned in the valley between the V of the cylinder banks 27 and below the duct 35. As a result, this air flow will further serve to cool the ignition system.

Figure 2:
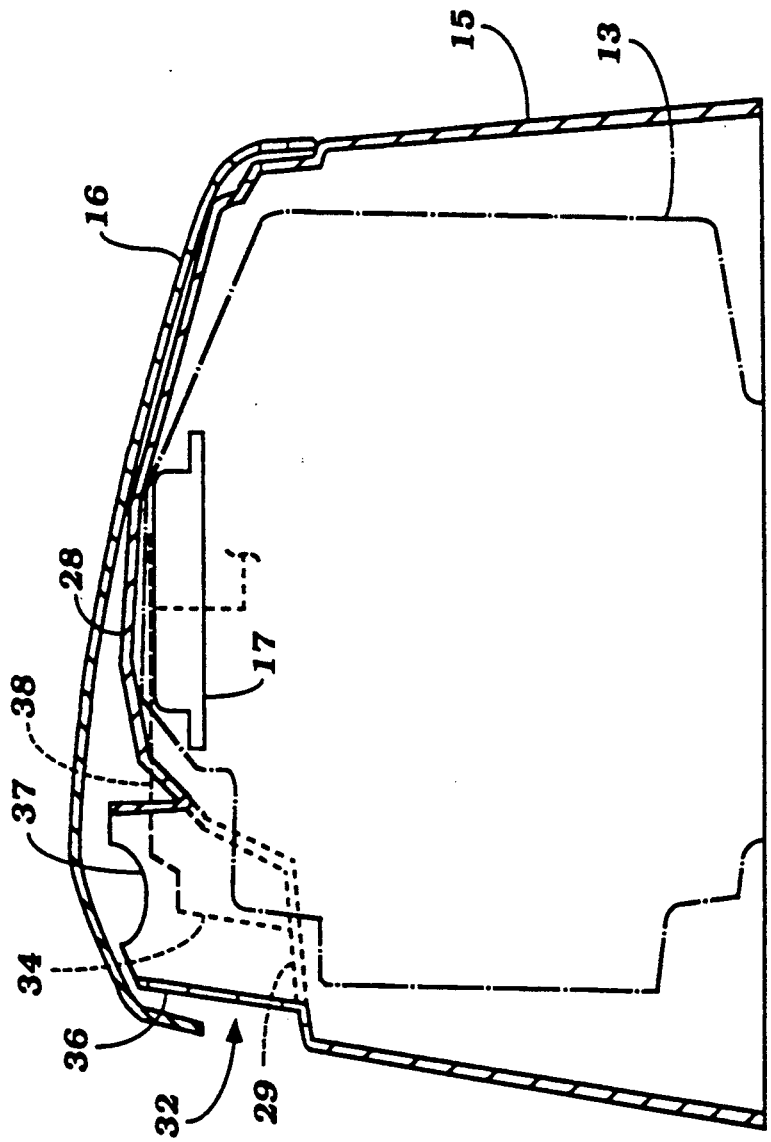
FIG. 2 is an enlarged cross sectional view of the protective cowling showing the engine in phantom and taken generally along the line 2—2 of FIG. 3.

From the foregoing description it should be readily apparent that the described duct configuration provides adequate air flow for the engine without inducing high flow velocities or other characteristics that could draw water into the interior of the protective cowling. In addition, the configuration provides good water separation for any water that may enter the openings 32. In addition, any water so entering can easily drain back out of the opening 32 since the wall 29 is tapered downwardly as best shown in FIG. 2.

The foregoing description is that of a preferred embodiment of the invention. Various changes and modifications may be made without departing from the spirit and scope of the invention, as defined by the appended claims.

I claim:

1. A protective cowling for the power head of an outboard motor to protect and provide an induction air supply for a V type internal combustion engine, said engine including a pair of angularly disposed rearwardly diverging cylinder banks, said protective cowling comprising a main cowling portion fixed to a lower tray and enclosing therewith the engine and defining a volume therearound, a cover fixed to the top of said main cowling portion and forming a cavity above said main cowling portion, an air inlet means formed between said main cowling portion and said cover for delivering atmospheric air to said cavity and at least three air delivery ducts each having opposed upwardly extending sidewalls terminating in an inlet opening at the tops thereof formed in the top of said main cowling portion for communicating said cavity with said volume for delivering atmospheric air to the engine for its operation, one of said ducts forming a center duct lying over the area between said cylinder banks and the other of said ducts each lying in part over a respective one of the cylinder banks.

2. A protective cowling as set forth in claim 1 wherein the pair of ducts are disposed on opposite sides of the main cowling portion and spaced forwardly from the center duct.

3. A protective cowling as set forth in claim 2 wherein the pair of ducts have their inlet openings disposed lower than the inlet opening of the center duct.

4. A protective cowling as set forth in claim 3 further including wall means interposed between the air inlet means and the inlet openings of the ducts for redirecting the air flow toward the duct inlet openings and for separating water from air flowing therein.

5. A protective cowling as set forth in claim 4 wherein the air inlet means has a vertical height less than the vertical height of the wall.

6. A protective cowling as set forth in claim 1 wherein the main cowling portion comprises a main cowling member having a depression at one end thereof and the cover is affixed to the main cowling portion and covering the depressed portion, said cover and said main cowling part defining between them the air inlet means.

7. A protective cowling as set forth in claim 6 wherein the pair of ducts are disposed on opposite sides of the main cowling portion and spaced forwardly from the center duct.

8. A protective cowling as set forth in claim 7 wherein the pair of ducts have their inlet openings disposed lower than the inlet opening of the center duct.

9. A protective cowling as set forth in claim 8 further including wall means interposed between the air inlet means and the inlet openings of the ducts for redirecting the air flow toward the duct inlet openings and for separating water from air flowing therein.

10. A protective cowling as set forth in claim 6 wherein the pair of ducts are disposed on opposite sides of the main cowling portion and spaced forwardly from the center duct.

11. A protective cowling as set forth in claim 10 wherein the pair of ducts have their inlet openings disposed lower than the inlet opening of the center duct.

12. A protective cowling as set forth in claim 11 further including wall means interposed between the air inlet means and the inlet openings of the ducts for redirecting the air flow toward the duct inlet openings and for separating water from air flowing therein.

13. A protective cowling as set forth in claim 12 wherein the air inlet means has a vertical height less than the vertical height of the wall.

* * * * *